United States Patent [19]

Weiss et al.

[11] 4,279,756

[45] Jul. 21, 1981

[54] WATER CLARIFICATION

[75] Inventors: Donald E. Weiss, Blackburn; Luis O. Kolarik, Forest Hill; Anthony J. Priestley, Elsternwick; Nevil J. Anderson, Sandringham, all of Australia

[73] Assignee: Commonwealth Scientific and Industrial Research Organization, Campbell, Australia

[21] Appl. No.: 944,125

[22] Filed: Sep. 19, 1978

Related U.S. Application Data

[63] Continuation-in-part of Ser. No. 792,767, May 2, 1977, abandoned.

[30] Foreign Application Priority Data

May 3, 1976 [AU] Australia ............................ PC5798
Mar. 25, 1977 [AU] Australia ............................ PC9576
Sep. 22, 1977 [AU] Australia ............................ PD1779

[51] Int. Cl.$^3$ ............................................. B01D 15/08
[52] U.S. Cl. ................................. 210/667; 210/695; 210/711; 210/673; 210/205
[58] Field of Search .................... 210/28, 30 R, 32, 33, 210/34, 42 S, 36, 45, 47, 51-53, 59, 60, 192, 198 R, 506

[56] References Cited

U.S. PATENT DOCUMENTS

| 3,499,837 | 3/1970 | Jaunarajs ........................... 210/59 |
| 3,536,198 | 10/1970 | Bartnik et al. ................... 206/236 |
| 3,549,527 | 12/1970 | Peck et al. ........................ 210/54 |
| 3,697,420 | 10/1972 | Blaisdell et al. ................. 210/42 R |
| 3,890,224 | 6/1975 | Weiss et al. ...................... 210/30 |
| 4,081,365 | 3/1978 | White et al. ...................... 210/28 |

FOREIGN PATENT DOCUMENTS 197806 6/1978 United Kingdom ..................... 210/28

OTHER PUBLICATIONS

Canadian Mining and Met. Bull. 3-1969, 263-266 "Chemical Magnetic Flocculatior Process", Bartnik et al.
Iron & Steel Engineer, 10-1969, pp. 79-83, Peck et al.
JAWWA, 6-76, pp. 325-327, "High Gradient Magnetic Separation" deLatour et al.
JAWWA, 8 and 9-1976 pp. 443-446 and 498-500 respectively, deLatour et al.
Chem. Engineering, Jul. 1975, p. 56, "Suspended Solids Separator Swiftly Solves Clarity Woes (New Products & Services Item)".

Primary Examiner—S. Leon Bashore
Assistant Examiner—Ferris H. Lander
Attorney, Agent, or Firm—Cushman, Darby & Cushman

[57] ABSTRACT

A particulate coagulant/adsorbent for removing suspended impurities and colored substances from water by coagulation comprises a finely divided particulate mineral or clay material, the individual particles of which have been treated to produce a thin hydroxylated surface layer haivng a positive zeta potential at the adsorption pH.

A process and an apparatus for water treatment utilizing the coagulant/adsorbent and providing for regeneration and recycling thereof are also described.

29 Claims, 4 Drawing Figures

WATER CLARIFICATION

CROSS REFERENCE TO RELATED APPLICATION

This application is a continuation-in-part of our co-pending U.S. Patent Application Ser. No. 792,767, filed May 2, 1977 and now abandoned.

This invention is concerned with a new type of material for removing suspended impurities and colour from water by coagulation and adsorption. The new material gives more rapid and better clarification and decolourisation than the conventional alum treatment and uses only a small proportion of any of the usual amount of coagulant required for such treatments. In its preferred form, the invention utilizes magnetized or magnetizable to facilitate the settling of the sludge and the recovery and re-use of the coagulant.

The invention also includes methods of and apparatus for water purification which utilize the new material.

The currently standard process for the clarification and decolourisation of turbid waters and effluents involves a coagulation process followed by sand filtration. The water is mixed with an appropriate amount of an aluminium salt, or a ferric salt, (the coagulant) and adjusted to a pH were the metal forms insoluble, positively-charged hydrolysis products. For aluminium sulphate (alum), the optimum pH will range from 5 to 7, depending on the water. Negatively-charged colloids in the feed water (e.g. bacteria, virus, clays, etc) and the natural colouring matter in water (humic and fulvic acids) become attached to and entrapped within the floc and settle with it. Settling normally takes place in a settling tank and residual floc in the overflow from the settling tank is removed by passage through a sand filter to produce a sparkling clear water. Once the pressure drop through the sand filter becomes excessive the bed is backwashed to remove the deposited floc.

In practice, the coaulation process is usually carried out in three distinct zones. First, the coagulant, and any acid or alkali required for pH adjustment, are rapidly mixed with the incoming feed water for a short time to form micro-flocs of the metal hydroxide. These are next gently agitated with the water to promote attachment of the colloids to the floc; excessive agitation is avoided as it disperses the fragile flocs. Finally, the mixture passes to a settling zone where the flocs are settled out.

This prior art process has several problems;-

First, the flocs are fragile and do not settle rapidly so that a large residence time must be allowed in the settling tank and the equipment is correspondingly large. Even so, settling is never complete and the overflow must be clarified by sand filtration.

Second, chemicals are expended in forming the floc and account for the major cost of the process.

Third, the final sludge is not composed solely of the clays, etc. removed from the water but contains as well a much larger volume of the hydrous metal hydroxide. Not only does the disposal of this sludge create problems but it also entrains a substantial amount of water which is lost from the feed water.

There have been a number of attempts to improve settling rates.

It has been known for some time that colloidal suspensions, which in natural waters are usually negatively charged, can be removed by the use of natural or synthetic cationic flocculants in place of, or in conjunction with the usual agents such as alum, etc. The cationic polyelectrolytes act generally by destablising the suspension through a charge neutralization effect. This causes individual collids to collect in small aggregates or microflocs. By gently mixing, the microflocs can be converted into large macroflocs which will settle more rapidly. This second stage can be improved by the use of long chain non-ionic or anionic flocculants. These materials act by forming long chain bridges in between microflocs.

An alternative is to add a finely divided solid to the feed water so that it becomes entrapped with the floc and, by raising its density, settling is facilitated. A variant of the latter is to use a ferromagnetic particle so that the floc can be removed by magnetic means; however, this does not reduce significantly the amount of coagulating chemical needed to produce satisfactory flocs.

The principal objects of this invention include the provision of a material and method for the clarification of water, and the removal of colour and micro-organisms such as bacteria, virus and algae, which eliminate the use of coagulant or at least enables the use of much less than hitherto to achieve a given degree of clarification, which produces a sludge which for the most part is composed of the particulate matter removed from the water and which accelerates settling of the floc. Other objects include the provision of such a method which facilitates removal by magnetic means and which eliminates the need for a sand filter, and the provision of apparatus for carrying out the method. As hereinafter described these objects are achieved in accordance with the invention, by using what is believed to be a novel coagulating and decolourising material.

We have found that three conditions must be met for the attachment of colloids to a particulate surface.

1. The surface should carry a charge of opposite sign to that of the colloids (as measured by zeta potential), 2. The surface must be such that the colloid can be held by multipoint attachment, and 3. The particle to which the colloids are to attach must be small. For example, an anionic exchange resin, having the normal degree of crosslinking, will not absorb clay particles on to its surface to any significant extent even though the clay has an opposite zeta potential charge and the resin is very finely divided. Likewise finely divided magnetite has a positively charged surface but will only weakly adsorb large colloids of opposite charge, such as clay for example.

However, we have found that if micron size particles are treated so as to produce a hydroxylated surface thereon (such a particle being referred to herein as a "gel particle") and are suspended in turbid water with the pH adjusted so that the particle surface has a positive zeta potential then the negatively charged colloids normally present in natural waters and many effluents will readily attach to the surface. Provided sufficient gel particles are present to provide an adequate surface area then it is possible to effect substantial or even virtually complete removal of the colloids.

In accordance with one aspect of the present invention, therefore, we provide a particulate adsorbent for removing suspended impurities and coloured substances from water by coagulation (hereinafter referred to as a "coagulant/adsorbent"), which comprises a finely divided particulate mineral or clay material, the individual particles of which have a thin hydroxylated surface layer having a positive zeta potential at the adsorption pH (as hereinafter defined).

As used herein the term "adsorption pH" means the pH of the water under treatement; it must be within the range of pH where the colloidal matter in the water retains some of its negative charge.

The invention will now be described and discussed in detail. Reference will be made to the accompanying drawings, in which.

The coagulant/adsorbent materials of the invention may be of two notionally different types: (I) those in which the hydroxylated layer is derived directly from the substance of the particles; and (II) those in which the layer is derived from another substance.

The preferred coagulant/adsorbent materials are those of type I and these can be derived from a wide variety of minerals and clays provided the nature of the mineral is such as to permit the ready formation of the hydroxylated surface. In this respect oxides and silicates are particularly useful. Examples of such minerals include zinc oxide, silica and siliceous materials such as sand and glass and clay minerals such as mica, china clay and pyrophillite. This list is not exhaustive, however, and many other minerals are suitable for use in this invention.

In the most preferred embodiment of this invention, the particulate material should be a magnetic or magnetisable material. For this purpose iron oxides, such as gamma iron oxide or magnetite, which are eminently suitable, or ferrites, such as barium ferrite or spinel ferrite, can be used.

The particles should be preferably in very finely divided form in order to be fully effective in removing colloids from solution. The particles should be less than 10 micron in size, preferably 1 to 5 micron.

The preparation of the gel particles of type I is simply carried out, usually by suspending the particles in alkali solution for a short period of time, preferably in the presence of air. Sodium hydroxide is probably most suitable, but potassium hydroxide or aqueous ammonia may also be used. Generally, alkali concentrations should be at least 0.01 N, preferably about 0.05 N to 0.1 N, at which level the treatment is effective after about 10 minutes. Shorter treatment times can be achieved by the use of elevated temperatures and/or higher alkali concentrations. A suggested temperature range is 40°-60° C. For example, a satisfactory material is produced using either 0.1 N sodium hydroxide at room temperature (i.e. about 20° C.) for ten minutes, or 0.05 N sodium hydroxide solution at about 60° C. for five minutes.

Because the hydroxylated layer of the type II materials is provided by another substance, the range of starting materials is broader. A wide variety of minerals and clays can be used provided the nature of the mineral or clay is such as to permit the ready deposition of a hydroxide gel on its surface. In this respect oxides, sulphates, silicates and carbonates are particularly useful. Examples of such minerals include calcium sulphate, calcium carbonate, zinc oxide, barium sulphate, silica and siliceous materials such as sand and glass and clay minerals such as mica, china clay and pyrophillite. This list is not exhaustive, however, and many other minerals are suitable for use in this invention. In some cases, pre-treatment of the surface of the mineral may be required to produce a satisfactory deposition of the gel. Yet another alternative is to use hollow microspheres, e.g. of glass for the production of gel particles which can be separated from the water, after treatment, by flotation rather than sedimentation.

The hydroxylated layer of the gel particles of type II can be provided by any of a number of metal hydroxides, the requirements being substantial insolubility in water, a valency preferably of three or more, and a positive zeta potential at the adsorption pH, where the colloids retain negative charge. Suitable metals with this characteristic are ferric iron, aluminium, zirconium and thorium. Ferric hydroxide is preferred because it is cheap, and exceptionally insoluble, over a wide pH range. For example, it does not readily dissolve at high pH, as does aluminium hydroxide.

The preparation of the ge-coated particle of type II is also simply carried out, usually by suspending the particles in water, adding a salt of a suitable metal followed by an alkaline material, preferably in aqueous solution which will precipitate the metal hydroxide which then forms a coating on the particle. Typically, chlorides, sulphates, nitrates and the like are suitable salts of the metals, thus ferric chloride or aluminium sulphate could be employed. The alkaline material may be sodium hydroxide, calcium hydroxide ammonia or similar soluble material. The concentration at which the preparation is carried out is generally not critical.

In the case of where magnetite or other iron oxide materials are used as the basis for type II particles, the metal salt which is employed to produce the hydroxide layer may be obtained by first adding acid to the suspended of the particles (to give ferric and/or ferrous salts in solution from the iron oxide) and then adding the alkaline material.

It has been found advantageous, when forming the gel particles of type II to provide means for increasing the degree of polymerization of the gel. Polymerization occurs due to elimination of water and the establishment of oxygen ("ol") linkages between the metal atoms:

$$2MOH \rightarrow MOM + H_2O$$

This process occurs on standing, but can be accelerated by heating.

After preparation, it is best if the gel-coated particles are not permitted to dry out. This can be avoided by keeping them under water.

The invention thus offers a cheap, readily-prepared recyclable coagulant/adsorbent which removes colloidal particles, micro-organisms and colouring matter from water quickly and more economically, producing a sludge which is little different to the impurities removed from the water and is therefore readily disposable without environmental problems.

In another aspect the invention provides a method for clarifying water, which comprises contacting the water with the above-described coagulant/adsorbent and then separating the water from the coagulant/adsorbent.

An important feature of the process of the present invention is that the gel particles can be recycled many times. To achieve this, the adsorbed material is removed by raising the pH of a suspension of the adsorbent in water. In the case of type I coagulant/adsorbents, the coagulating properties may be regenerated by treatment with alkali solution; these two treatments may be combined.

The gel particles may be used simply by adding them to the water to be treated, either in a batch process or in a continuous process by mixing them with the incoming water, stirring them for a sufficient period to allow the colloids and colouring matter to adhere to the particles and then permitting the particles to settle. The clarified water can be removed and the particles regenerated by the addition of a solution of a suitable alkaline material. As mentioned earlier, the pH of the water to be treated must be adjusted after addition of the particles.

Furthermore, we have also discovered in accordance with a further aspect of this invention, that if a small quantity of multi-valent cation having a valency of three or more (e.g. $Fe^{3+}$ or $Al^{3+}$) is added to the water after the addition of the gel particles, then the amount of the cation added is substantially less than would be required to produce water of comparable clarity by using the cation alone, with appropriate addition of alkali or acid, to form an absorptive floc as in the usual process of water coagulation. In many situations, but not all, the optimum economic situation will be to use the gel particles in combination with a small amount of such a cation.

Figure 1A:
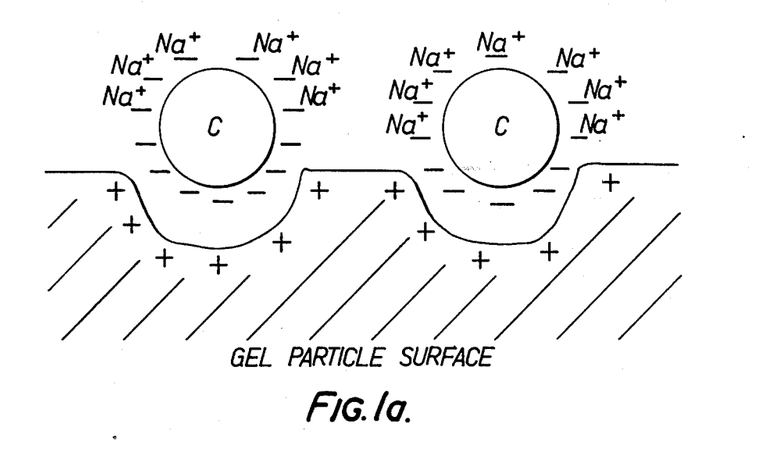
FIG. 1 is a diagrammatic representation showing the effect of multivalent cations on the absorption of colloids by the hydroxylated surface of the gel particle.
Figure 1B:
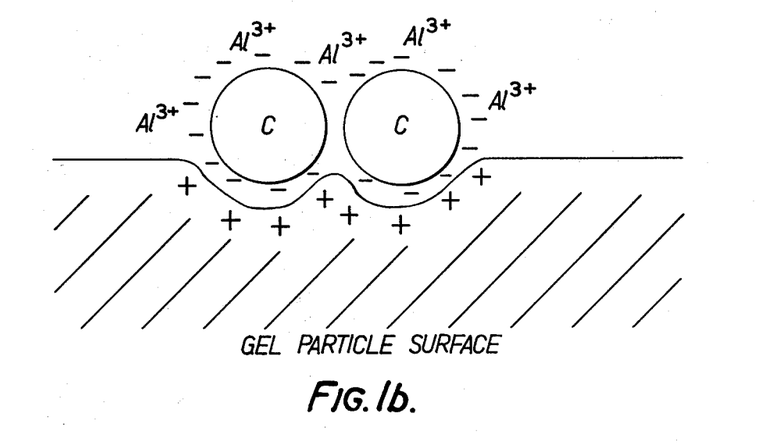

It is thought that after the gel particles have adsorbed some of the colloidal particles, the addition of limited amounts of the multivalent cation suppresses, but does not completely eliminate, the negative charge on the remaining colloids so that when part of their negative surface binds to the positive region of the gel particle, electrostatic repulsion between neighbouring colloids on the gel particle surface is reduced. Consequently the colloids can pack together more closely on the gel particle surface so that less of the latter is required. This is shown diagrammatically in FIG. 1. When the colloid's negative charge is neutralized by monovalent cations such as $Na^+$ (FIG. 1a) the colloid has a high zeta potential and there is strong repulsion between adjacent colloids on the gel surface. When the colloid adsorbs on the surface of the gel particle, some of its $Na^+$ counter ions are replaced by the positive charges on the gel surface and electrostatic binding results, no doubt assisted by hydrogen bonding and the like. If the remainder of the $Na^+$ is replaced by aluminium, or other multivalent ions, then the electrostatic repulsion is suppressed and the particles can pack more closely together (FIG. 1b).

The final sludge from this process consists essentially of the colloids removed from the original water, but when multivalent cations are added to facilitate the process these colloids are rejected with multivalent cations replacing most of the monovalent cations which were present in the diffuse double layer of the original colloid. Thus the presence of the voluminous iron or aluminium hydroxide floc in the sludge of the conventional process is avoided and disposal of the sludge is greatly facilitated. For example, if river water is being clarified the sludge could be returned to the river with little environmental harm. After desorption, the regenerated gel particles can be recycled for the adsorption of more colloids at a lower pH. Thus the net multivalent ion requirement of the process is greatly reduced.

The positively-charged nature of the coated adsorbent particles of this invention also leads to the adsorption of acidic materials which comprise the natural colouring matters often present in water. Thus the application of the present process results in substantial or complete removal of such colour from water, often to an extent which cannot be achieved by conventional alum treatment.

As indicated above, a much better purification is usually achieved in high turbidity water if a suitable coagulant is also added to the water. For this purpose, aluminium sulphate (alum) is the most convenient, but other materials such as ferric chloride or an organic polyelectrolyte may be used. This addition is best made shortly after the gel particles have been added, and the pH of the water has been adjusted. The mixture is stirred for a suitable time and then the sludge allowed to settle.

When polyelectrolytes are added to the water to be clarified, after mixing with the gel particles, the product water in many cases has a lower turbidy and the rate of coagulation or of settling is considerably faster than when the gel particles are used alone or in conjunction with alum.

As most natural waters contain particles which are negatively charged, the most useful polyelectrolytes for the purpose of this invention are the strongly cationic materials. Many synthetic materials are available, and these are generally high molecular weight polyamides or polyamines. The most common materials are derivatives of polymerised acrylamide and typically molecular weights determined on a viscosity bases are in the range of $10^5$–$10^7$. Many commercial materials are made by copolymerisation of acrylamide and quaternary ammonium polyacrylamides. Another class of catonic polyelectrolytes are the polyethylene imines. These are generally of lower molecular weight than polyacrylamides.

In some cases, neutral and anionic polyelectrolytes can produce a useful effect. This is thought to be due to a bridging effect. The most common type is also a polyacrylamide generally made by copolymerisation of acrylic acid and acrylamide or by the partial hydrolysis of polyacrylamide. The proportion of acid groups in anionic electrolytes is generally in the range 5–40%.

Many synthetic polyelectrolytes are sold commercially, but details of their structure are difficult or impossible to obtain. In the examples, therefore, we have used the code numbers of commercial materials.

Natural polymeric flocculants can also be useful, particularly those with cationic groups. Thus glue and gelatine are effective materials, as are cationic modified starches. Other natural polymeric flocculants are known.

There is a striking difference in behaviour when an untreated finely divided mineral particle (e.g. magnetite) is added to turbid water along with coagulant chemicals, compared with the behaviour of the gel particles of the invention. In the former case the mineral coprecipitates with the colloids, and whilst its presence will accelerate settling it is only possible to reduce the amount of coagulant a slight amount to achieve comparable clarification. On vigorous shaking the floc and colloids separate from the magnetite. When the gel particles of the invention are added, however, each particle is observed to be a separate entity and to be completely coated with colloids; a large reduction in the amount of coagulant can be achieved. At the same time the colloids are very firmly attached to the particles and remain so even under vigorous conditions of stirring. When the gel particles are magnetic, they are readily removed by magnetic means in a magnetic separator, or by applying a magnetic field to cause the particles to flocculate and settle rapidly; a sparkling clear supernatant can be obtained. Under similar conditions, the agglomerate produced by untreated magnetite tends to disperse under the agitation conditions and a cloudy supernatant results. Thus by using the gel particles of the invention water of high clarity can be obtained simply by permitting the particles to separate by sedimentation or by using a magnetic separator; a sand filter is not required. If simple sedimentation is to be used then the mineral core of the gel particle can be any inert material, e.g. sand. However, it is preferable to use a soft ferromagnetic material (e.g., magnetite) to permit accelerated removal of the gel particles with attached colloids by magnetic means. In such a case the gel particles should preferably not be magnetized whilst the colloids are being adsorbed but can be subsequently magnetized prior to separation from the water. There is advantage in collecting the particles by passing the slurry through a magnetized wire packing to which they adhere. Later they can be removed by switching off the magnetic field. This mode of operation reduces abrasion between the particles with consequent removal of the gel coat and so facilitates their mechanical handling.

Regeneration of the gel particles is simple and merely requires adjustment of the pH of the sludge to about pH 10, separation of the adsorbed material and, in the case of the type I material, treatment of the gel particles by the same process as was described for their preparation.

An alternative method of operating the process is to use the gel particles in the form of a filter bed through which the feed water, at the appropriate pH and containing the coagulant (if used) is percolated. In this case the gel particles should be at least 100 microns in size. The colloids attach to the gel particles during passage through the bed so that clear water emerges. Once the bed has become saturated and the quality of the emerging water begins to decline beyond a specified point, the feed water flow is stopped. The bed is then backwashed and the contaminants removed by passing through a flow of water at a high pH at a velocity which slightly expands the bed but which avoids violent mixing and abrasion of their surface (as in conventional sand filtration). The colloids and colour are thereby removed. The bed is then regenerated, in the case of the type I adsorbent, by adding sodium hydroxide solution to the bed and allowing contact for sufficient time to reactivate the surface.

This procedure differs from conventional sand filtration, where a floc is formed within the sand bed by addition of alum and alkali with the feed water in several crucial respects. The coagulant requirement is much less because of re-use of the gel particles. Backwashing is conducted so as to preserve the active gel layer on the bed particles and permit release only of the adsorbed colloids; conventional practice aims to remove all material from the surface of the bed particles by violent agitation, e.g. by air scouring.

A modification of the above method is the use of gel particles in the filter bed which are ferro-magnetic and which have been magnetised prior to use. This flocculates the particles and so increases their void volume thereby enhancing the ability of the filter bed to retain adsorbed particles.

While at least some of the benefits of the above-described coagulant/adsorbent material can thus be obtained by application of known methods and apparatus, the full advantages are more readily realizable with a method and apparatus therefore which we have specifically designed for this purpose. This method and apparatus will now be described in more detail with reference to FIGS. 2 to 4 of the accompanying drawings, which relate to water treatment using type I coagulant/adsorbents.

Figure 2:
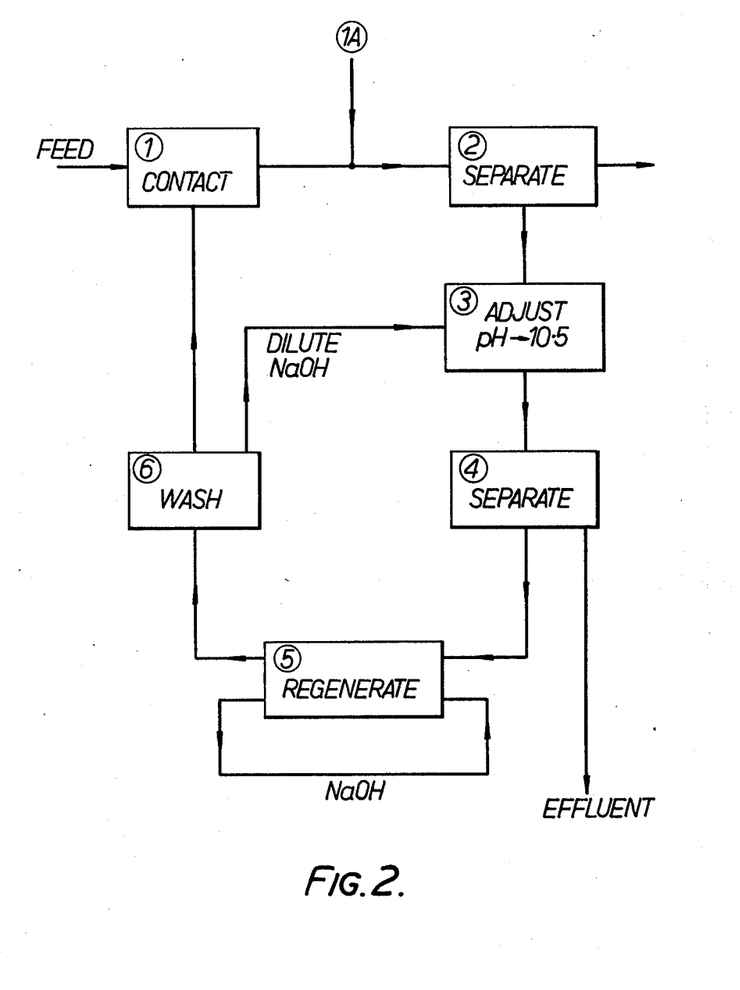
FIG. 2 is a flow diagram showing a preferred method of water treatment in accordance with the invention.

As illustrated in FIG. 2, at Stage 1 feed water to be treated is contacted with the coagulant/adsorbent in any suitable liquid solid contactor. Alum and/or a polyelectrolyte is then added, if necessary or desirable at stage 1A, and after further mixing the clarified water is separated from the coagulant/adsorbent in the separation stage 2. The spent coagulant/adsorbent is then treated with dilute caustic soda at stage 3 to free the coagulant/adsorbent from the adsorbed contaminants. After a further separation stage 4, the contaminants pass to waste as effluent, while the coagulant/adsorbent passes to a regeneration stage 5 where it is treated with 0.1 N caustic soda which is continuously recycled (with make-up when necessary). The coagulant/adsorbent is then washed at stage 6 with water. The washings (dilute caustic soda) are recycled to stage 3 while the regenerated coagulant/adsorbent is recycled to stage 1.

Figure 3:
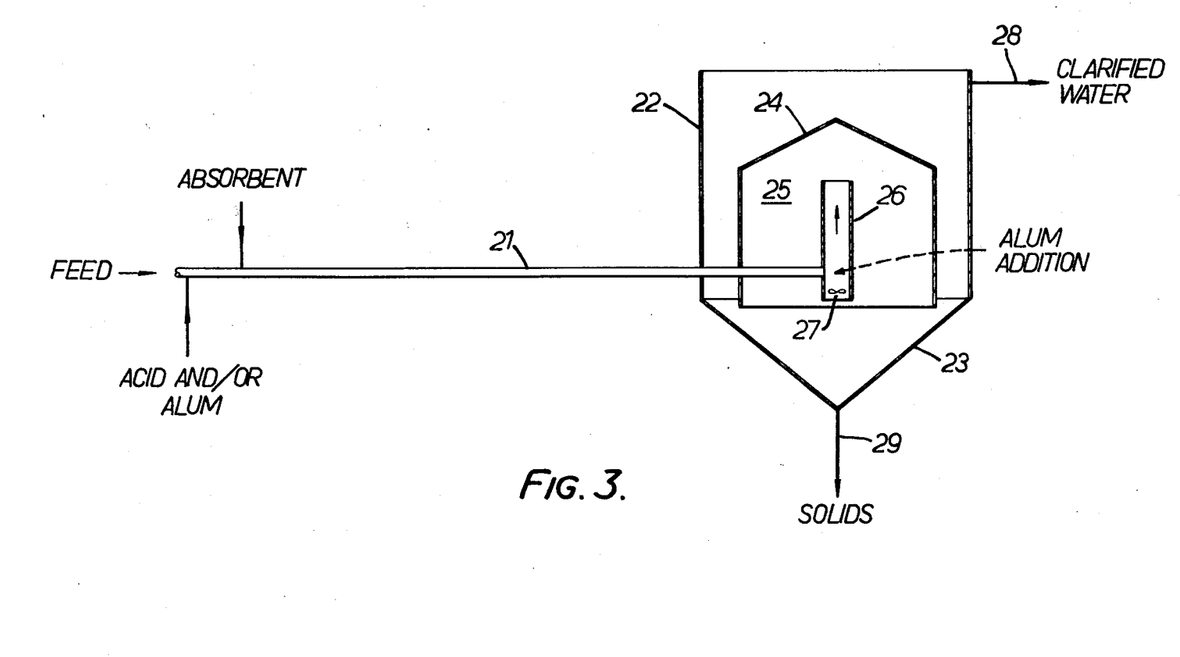
FIG. 3 is a diagram of a solids contact clarifier for use in the method of the invention.

FIG. 3 shows a form of solids contact clarifier which is suitable for the stage 1 and 2 operations described above. This apparatus is used in conventional water treatment processes and is designed to ensure efficient contact between suspended matter and a reagent, such as an alum solution, by circulating water containing the suspended matter around a zone into which the reagent is introduced.

The apparatus consists of a long pipe 21 and a vessel 22. The latter is generally in the form of closed cylinder with an integral, conical base portion 23. Within the vessel 22 there is mounted an inverted cup-like housing 24 which is of generally similar shape to the vessel 22, and serves to define an inner chamber 25. Centrally located in the chamber 25 is a short vertical pipe 26. The pipe 21 is connected into the pipe 26 near the bottom of the latter. An impeller 27, to aid liquid circulation in the chamber is mounted within the bottom portion of pipe 26. Clarified water and settled solids outlets 28, 29 are at the top and bottom, respectively, of the vessel 22.

In typical operation, the turbid feed water is admitted to the pipe 21, at such a rate that it would take about 5 minutes to pass to the vessel 22. Acid to adjust the pH to the optimum for the particular water and the coagulant/adsorbent are introduced at, or near to, the inlet end of the pipe 21. Flow in the pipe 21 is turbulent to ensure thorough mixing. The water leaving pipe 21 flows up through the central pipe 26 into the surrounding chamber 25. Alum or a polyelectrolyte, if required is introduced (by means not shown) into the pipe 26 and/or at or near the inlet end of pipe 21. Clear water is drawn off through outlet 28 at the top of the vessel 22 and the settled coagulant/adsorbent, together with attached impurities at the bottom outlet 29. Precipitation of the coagulant/adsorbent may be facilitated by using a magnetizable adsorbent. The equipment can be operated continuously, and the adsorbent regenerated in a separate stage (as described above) by raising the pH of the slurry to about 10.5, separating the released floc and colouring matter, and treating the adsorbent with an alkaline solution as described above.

In using the coagulant/adsorbents of this invention it will be found that maximum clarification depends on the pH of the feed water. The optimum pH is usually in the range 3 to 5, but as it may vary from sample to sample, it is therefore recommended to test samples and adjust the feed water pH to optimum by addition of acid and/or alum. When the coagulant/adsorbents are used in conjunction with alum, it will normally be found that the optimum pH for alum alone is suitable, typically about 5. When the adsorbent is used alone or with a polyelectrolyte it is frequently advantageous to lower the pH to about 4 or less.

Figure 4:
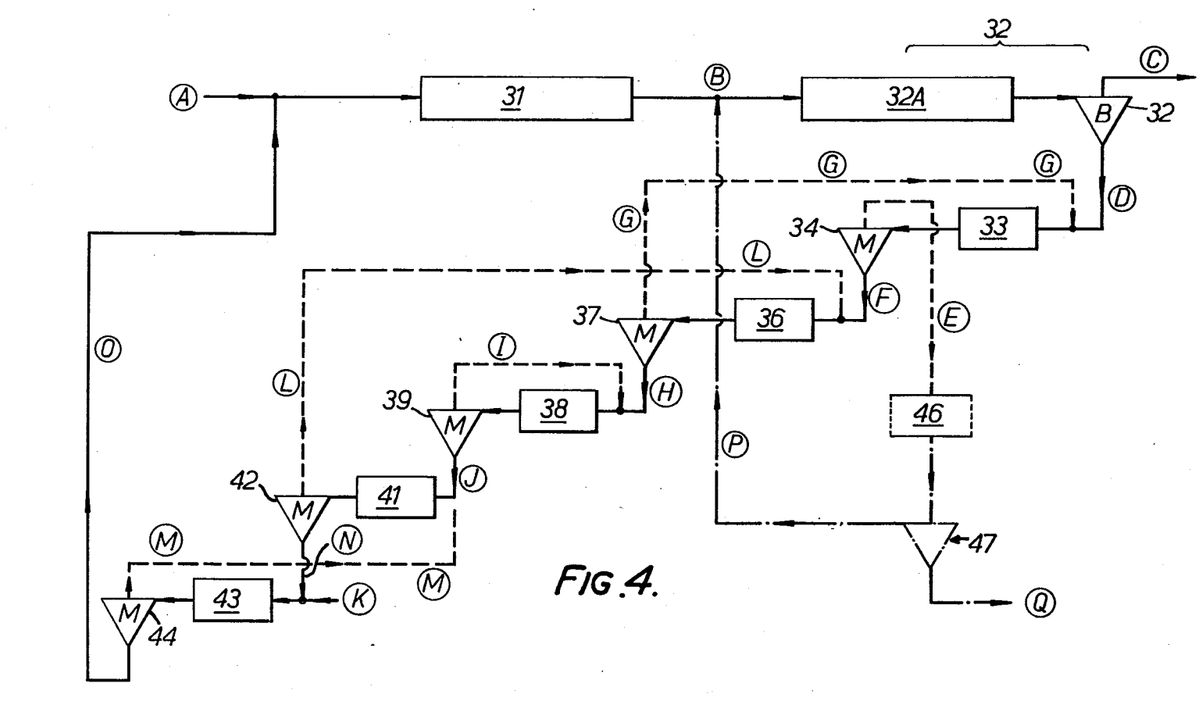
FIG. 4 is a diagram showing a preferred form of apparatus for carrying out the method of the invention.

A complete and preferred water treatment system is shown in FIG. 4.

The incoming feedwater (A) and regenerated coagulant/adsorbent (magnetite) are fed to a contactor 31, which may be a pipe as described above (21 in FIG. 3) or any other suitable apparatus, for example a channel, trough or tank provided, if necessary, with stirring equipment. Where necessary alum (B) is added to the mixture as it leaves the contactor 31. The mixture then passes to a solids clarifier 32, which may be of the type described above (FIG. 3), or as shown may comprise a separate clarifier 32A and solids/liquid separator 32B.

Clarified water (C) is taken off as the overflow from the separator 32B or clarifier 32 as the case may be.

The solids underflow (D) from 32B or 32 consists of the loaded coagulant/adsorbent, i.e. associated with the colloidal and other impurities. This passes to a first regeneration mixing stage 33, where it is mixed with recycled dilute caustic soda (G) to free the coagulant/adsorbent from the impurities, and thence to another magnetic separator 34 from which emerge an effluent stream (E) containing the impurities and partly regenerated coagulant/adsorbent (F). The stream (F) is mixed with further dilute caustic soda (L) to bring the pH to 10.5 and passes to the second regeneration mixing stage 35 and thence to a further magnetic separator 37.

The overflow stream of dilute caustic soda (G) from 37 goes for mixing with stream (D) and the underflow solids-containing stream (H) passes to a final regeneration stage 38 where it is mixed with 0.1 N caustic soda (I). This mixture passed to a further magnetic separator 39 from which the overflow stream (I) of caustic soda is recycled for mixing with stream (H) and the underflow solids (J) are mixed with recycled washwater (M) and pass to the first washing mixer 41.

From 41 the mixture passes to a further magnetic separator 42. The overflow liquid stream (L) of dilute caustic soda is recycled for mixing with stream (F) and the underflow solids stream (N) passes to the final washing mixer 43, where it is mixed with washwater (K), and thence to the final magnetic separator 44. The overflow stream (M) is recycled back to first washing stage for mixing with stream (J) and the underflow solids stream (O), which now contains regenerated and washed coagulant/adsorbent, is returned for mixing with further feed water (A).

Where alum is used, it may be desirable to make provision for recovery and recycling of this reagent and this optional arrangement is also shown in FIG. 4. Here the effluent stream (E) from the first magnetic separator 34 is adjusted to pH 3.5 in a mixer 46. The mixture is passed to a solids/liquid separator 47 from which the stream (P) of recovered alum solution may be recycled for mixing with stream (B) and the solid sludge of effluent (Q) finally passes to waste.

The mixing stages (33, 36, 38, 41, 43 and 46) may be performed in any suitable apparatus, such as pipes with turbulent flow, or channel, troughs or tanks with suitable stirring or mixing equipment.

Typical contact times for the main steps in the process are:

| Purification | 1st stage (31) | 5 minutes |
|---|---|---|
| | 2nd stage (32) | 5 minutes |
| Regeneration | final stage (38) | 10 minutes |

Similar apparatus and procedures to those described above may be adopted when using the type II coagulant/adsorbents. In this case, however, the regeneration stage(s) (5 in FIG. 2 and 38 in FIG. 4) are not required.

The following examples further illustrate the invention which is, however, not limited by these examples.

EXAMPLE 1—General Method of Preparation of the Type I Coagulant/Adsorbent

A magnetite ore from Savage River, Tasmania, was crushed and classified to yield 1–5 micron particles. A 10 ml portion of the particles was added to 200 ml of sodium hydroxide solution of appropriate concentration and at an appropriate temperature. The slurry was stirred for a period, usually 5 to 10 minutes. The particles were filtered and washed with water.

A number of samples were prepared under varying conditions. These were used in following examples and were regenerated under the conditions used initially. They are identified according to the code letter shown in the table below:

| Code Letter | NaOH Conc. | Temp. | Contact Time |
|---|---|---|---|
| A | 0.5N | 60° C. | 5 mins |
| B | 0.5N | 25° c. | 5 mins |
| C | 0.05N | 60° C. | 10 mins |

For comparison, in some examples, magnetite was treated both initially and in regeneration by slurrying in water adjusted to pH 10.5° at 25° C. for five minutes.

It was not given any stronger sodium hydroxide treatment as were the samples A, B and C. This sample is identified as sample D.

EXAMPLE 2—General Methods of Water Treatment

A. Standard Jar Test for Alum Treatment

To a 1l sample of water are added appropriate amounts of alum and acid to achieve optimum pH and coagulation (these amounts are determined in prior tests). The mixture is stirred rapidly (150 RPM) for 2 minutes and then continued at reduced speed (25 r.p.m.) for another 20 mins. and the flocs which form allowed to settle for 20 minutes. The unfiltered supernatant liquor is then analyzed for residual turbidity and colour. The turbidity was measured with a Hach 2100 A Turbidimeter and colour measured using a Hach Colour Measurement Kit.

B. Standard Jar Test for Magnetite in conjunction with Alum or a Polyelectrolyte A 1 l sample of water is contacted with 10 ml of magnetite for 7 min at 160 RPM after addition of the optimum amount of acid. Alum or polyelectrolyte is then added and the fast stirring continued for 2 minutes, followed by slower stirring at 75 RPM for 5 minutes. The mixing should be such as to keep the magnetite fully suspended. The stirring is then stopped and the magnetite allowed to settle for 5 minutes. The resulting unfiltered supernatant liquor is then analyzed for residual turbidity and colour. The magnetite is then separated by decantation and treated by the same method as described in Example 1.

C. Standard Jar Test for Magnetite Alone

A 1 l sample of water is contacted with 10 ml of magnetite for 15 minutes at 160 RPM at the optimum pH (determined in prior experiments). The stirring is stopped and the magnetite allowed to settle for 5 minutes. The unfiltered supernatant liquor is then analysed for residual turbidity and colour. The magnetite is then separated by decantation and treated by the same method as described in Example 1.

These conditions were found to be the most rapid to bring about optimum coagulation by each of the three methods. The total process time for each method is as follows:

Method A —42 minutes
Method B —19 minutes
Method C —20 minutes

EXAMPLE 3—Treatment of High Turbidity River Water

In this example, four samples of water from the Yarra River in Victoria with relatively high turbidity ranging from 18 NTU to 68 NTU and colour ranging from 55 Pt-Co units to 75 Pt-Co units were treated. Comparisons of standard alum treatment with treatments involving samples of magnetite activated according to Example 1, both with and without alum were made. The results are shown in Table 1 and generally are the average of a number of cycles, which have been made with magnetite regenerated after each coagulation.

EXAMPLE 4—Treatment of Low Turbidity/High Colour Water

In this example, two samples of water from the Yan Yean reservoir in Victoria were treated to remove colour. Again, treated magnetite, with and without alum added, was tested and compared with standard alum treatment and with untreated magnetite. As in the previous examples, the magnetite was generally recycled and the average results are quoted. Results are shown in Table II.

With this water, alum was not very effective for colour removal whereas magnetite treated according to the invention gave almost complete removal even without added alum. Other magnetites were largely ineffective.

EXAMPLE 5—Modified Regeneration of Magnetite

A modified procedure for the regeneration of magnetite was tested in comparison with the method described in Example 1. In the modified method, the magnetite was washed after treatment with 0.05 N sodium hydroxide and the washings kept. These were adjusted to pH 10.5-11 and used to treat the magnetite after the next flocculation cycle. Nearly all of the insoluble material was removed from the magnetite by this step, together with much of the adsorbed colouring material. The magnetite was separated from the liquor, washed and then treated with the 0.05 N sodium hydroxide solution. The remainder of the colour and insoluble material were thus removed. The magnetite was washed (and the washings retained for the next cycle) and then re-used for the next flocculation. The 0.05 N sodium hydroxide solution could be used for a very large number of cycles with occasional addition of more solution to make up for losses. Magnetite treated by this modified procedure gave results in clarifying and decolourising water which were indistinguishable from those obtained with magnetite regenerated according to Example 1. This method is particularly suitable for continuous operation.

EXAMPLE 6

Magnetites regenerated under other conditions were tested on water from the Yarra River in comparison with standard alum treatment. The regeneration was carried out by treating 10 ml of the magnetite with 40 ml of sodium hydroxide solution. The samples were identified according to the code letter shown in the table below.

| CODE LETTER | NaOH CONC. | TEMP. | CONTACT TIME |
|---|---|---|---|
| E | 0.05N | 60° C. | 5 mins |
| F | 0.05N | 40° C. | 10 mins |
| G | 0.1N | 25° C. | 10 mins |

The results obtained are shown in Table III.

TABLE 1

| Treatment Material | Treatment Method | Alum Added mg/l | Final pH | Raw Water pH | Raw Water T (NTU) | Raw Water C (Pt—Co) | Product Water T (NTU) | Product Water C (Pt—Co) | Comments |
|---|---|---|---|---|---|---|---|---|---|
| Alum | A | 10 | 5 | 7.1 | 68 | 55 | 9.5-9.8 | 40 | Colour removal poor |
| Alum | A | 20 | 5 | 7.1 | 68 | 55 | <1 | 5 | |
| $Fe_3O_4$A | B | 10 | 5 | 7.1 | 68 | 55 | <1 | 0 | Average of six cycles. Excellent clarity and colour |
| $Fe_3O_4$B | B | 10 | 5 | 7.1 | 68 | 55 | 1 | 0 | Average of six cycles. Excellent clarity and colour |
| $Fe_3O_4$D | B | 10 | 5 | 7.1 | 68 | 55 | 12 | 40 | Average of six cycles. Both turbidity and colour removal poor |
| Alum | A | 10 | 5 | 7.0 | 18 | 55 | 5 | 40 | Colour removal poor |
| Alum | A | 15 | 5 | 7.0 | 18 | 55 | 1.7 | 10-15 | Colour removal fair |
| $Fe_3O_4$A | B | 5 | 5 | 7.0 | 18 | 55 | 1-1.1 | 0 | Average of nine cycles. Excellent clarity and colour |
| $Fe_3O_4$B | B | 5 | 5 | 7.0 | 18 | 55 | 1.5-2.0 | 0-5 | Average of nine cycles. Excellent clarity and colour |
| Alum | A | 20 | 5 | 7.1 | 63 | 70 | 7.4 | 30 | Colour removal poor |
| Alum | A | 30 | 5 | 7.1 | 63 | 70 | 2.7 | 15 | Colour removal fair |

TABLE 1-continued

| Treatment Material | Treatment Method | Alum Added mg/l | Final pH | Raw Water pH | Raw Water T (NTU) | Raw Water C (Pt—Co) | Product Water T (NTU) | Product Water C (Pt—Co) | Comments |
| --- | --- | --- | --- | --- | --- | --- | --- | --- | --- |
| Alum | A | 35 | 5 | 7.1 | 63 | 70 | 2.2 | 10 | Colour removal fair |
| $Fe_3O_4$C | B | 15 | 5 | 7.1 | 63 | 70 | 1.0 | 0 | Average of six cycles. Excellent clarity and colour |
| $Fe_3O_4$D | B | 15 | 5 | 7.1 | 63 | 70 | 30 | 40 | Turbidity and colour removal poor |
| Alum | A | 20 | 5 | 7.1 | 31 | 75 | 4.2 | 35 | Colour removal poor |
| Alum | A | 30 | 5 | 7.1 | 31 | 75 | 2.4 | 20 | Colour removal fair |
| Alum | A | 40 | 5 | 7.1 | 31 | 75 | 1.9–2.2 | 10–15 | Colour removal fair |
| $Fe_3O_4$C | B | 15 | 5 | 7.1 | 31 | 75 | ≦1 | 0–5 | Average of seven cycles. Excellent result |
| $Fe_3O_4$C | C | — | 5 | 7.1 | 31 | 75 | 8.9 | 20 | |
| $Fe_3O_4$C | C | — | 4 | 7.1 | 31 | 75 | 1.7 | 0–5 | Lower pH markedly improves performance. Result is better than the best alum treatment for this water. |

GENERAL COMMENTS.
Not only does the treated magnetite give better results than alum alone, but using half or less the amount alum, but it is done in less than half the time. Removal of colour by the treated magnetite was particularly good.

TABLE II

| Treatment Material | Treatment Method | Alum Added mg/l | Final pH | Raw Water pH | Raw Water T (NTU) | Raw Water C (Pt-Co) | Product Water T (NTU) | Product Water C (Pt--Co) | Comments |
| --- | --- | --- | --- | --- | --- | --- | --- | --- | --- |
| Alum | A | 25 | 5 | 7.1 | 2.0 | 70 | 1.3 | 25 | Colour removal poor |
| Alum | A | 30 | 5 | 7.1 | 2.0 | 70 | 0.7 | 20 | Colour removal poor |
| Alum | A | 25 | 5.5 | 7.1 | 2.0 | 70 | 1.3 | 20 | Colour removal poor |
| $Fe_3O_4$C | B | 15 | 5 | 7.1 | 2.0 | 70 | 0.7 | 0–5 | Excellent colour removal |
| $Fe_3O_4$* | C | — | 4 | 7.1 | 2.0 | 70 | 3.9 | 40 | Poor result |
| $Fe_3O_4$D | C | — | 4 | 7.1 | 2.0 | 70 | 3.4 | 35 | Poor result |
| $Fe_3O_4$C | C | — | 4 | 7.1 | 2.0 | 70 | 0.6–0.8 | 0–5 | Excellent colour removal |
| Alum | A | 15 | 5 | 7.0 | 1.8 | 60 | 1.5 | 30 | Colour removal poor |
| Alum | A | 15 | 5.5 | 7.0 | 1.8 | 60 | 1.7 | 20 | Colour removal poor |
| $Fe_3O_4$ | C | — | 4 | 7.0 | 1.8 | 60 | 0.3–0.4 | 0 | Excellent colour removal |

*Fresh, untreated $Fe_3O_4$ used.

TABLE III

| Treatment Material | Treatment Method | Alum Added mg/l | Final pH | Raw Water pH | Raw Water T (NTU) | Raw Water C (Pt—Co) | Product Water T (NTU) | Product Water C (Pt—Co) |
| --- | --- | --- | --- | --- | --- | --- | --- | --- |
| Alum | A | 30 | 5 | 7 | 26 | 70 | 1.2 | 10–15 |
| E | C | — | 4 | 7 | 26 | 70 | <1 | 0 |
| F | C | — | 4 | 7 | 26 | 70 | 1–1.2 | 0 |
| G | C | — | 4 | 7 | 26 | 70 | 1.3 | 0 |

The following examples illustrate the preparation and use of the Type II coagulant/adsorbent.

EXAMPLE 7—Preparation of the Gel Particles on Magnetite

A magnetite ore from Savage River, Tasmania, was crushed and classified to yield 1–10 micron particles. These were slurried in water to which a hydrolysable metal salt was added (ferric chloride or aluminium sulphate in this example), followed by sodium hydroxide solution to adjust the pH to the desired level. After the precipitation of the hydroxide coating was complete, the mixture was heated to increase the polymerization of the coating—1 hour at boiling point for a ferric hydroxide coating, 40 minutes at 80° C. for an aluminium hydroxide coating. The supernatant liquor was then decanted off and the coated particles thoroughly washed by decantation with cold water.

Three samples were prepared under the conditions shown in Table IV.

TABLE IV

| Code No. | Raw material charges | pH for precipitation |
| --- | --- | --- |
| Fe Mag 1 | 0.5g $FeCl_3 \cdot 6H_2O$/g . $Fe_3O_4$ in 2.5 ml water | 11.5 |
| Fe Mag 4 | 0.085g $FeCl_3 \cdot 6H_2O$/g $Fe_3O_4$ in 2.5 ml water | 9.8 |
| Al Mag 2 | 0.5g $Al_2(SO_4)_3 \cdot 16H_2O$/g $Fe_3O_4$ in 250 ml water | 5.5 |

EXAMPLE 8—Purification of River Water

Standard jar tests were carried out with Yarra River water (turbidity 12 NTU, colour 65 Pt/Co units) whereby aluminium sulphate (alum) plus coagulant/adsorbent, was mixed for a predetermined time, after which mixing was stopped. After a further specified time for settling the turbidity and colour of the supernatant liquid was measured. In the experiments using the coated particles the sediment was removed, regenerated by washing with NaOH solution at pH 10.5, rinsed and then recycled. After thirteen such complete cycles the results of turbidity and colour removal for the fourteenth cycle were taken, and are shown in Table V. The amount of the coated particles added was 5 ml/l (settled volume) in all cases. An identical run using alum alone was carried out for comparison.

TABLE VI

| Alum Level | 5 mg/l alum | | 10 mg/l alum | |
|---|---|---|---|---|
| Coagulant/adsorbent | T | C | T | C |
| Fe Mag 1 | 1.5 | 10 | 0.35 | 5 |
| Fe Mag 4 | 5.0 | 30 | 0.85 | 10 |
| Alum | 9.9 | 50 | 3.6 | 25 |

T = Residual Turbidity N.T.U.;
C = Residual Colour Pt/Co Units

It can be seen that the use of the gel-coated particles of this invention give remarkably better removal of turbidity and colour using low levels of alum than the alum alone. At the 10 mg/l level of alum, water of acceptable quality is produced by the gel-coated particles, but not by alum alone.

A significant advantage exhibited by the treated particles was the short time required for treatment and settling. Thus the treated particle experiments required only 12 minutes total to achieve the clarification shown, whereas alum required at least 35 minutes.

The treated particles after separation of the clear supernatant liquid were regenerated by the addition of a small quantity of approximately 0.5 N sodium hydroxide. The release of the attached impurities was demonstrated by plotting pH of the slurry against turbidity or apparent colour and iron content of the liquid layer. The results showed that as the pH is increased, colour and turbidity increase in the water layer, corresponding to their removal from the treated particles. This transfer occurs mainly at pH 9 to 10. At the same time, an amount of iron salt is removed corresponding to the amount of iron present in the original water.

EXAMPLE 9

This example illustrates the effect of recycling on the performance of the treated particles. The flocculation was carried out as described in Example 7 (except that 15 mg/l of alum was used) using a ferric hydroxide coated particulate magnetite and one coated with aluminium hydroxide. The results obtained are shown in Table VII.

TABLE VII

| Cycle | 1 | | 2 | | 3 | | 4 | | 5 | |
|---|---|---|---|---|---|---|---|---|---|---|
| | T | C | T | C | T | C | T | C | T | C |
| 3.7 ml Fe Mag 1 | 0.78 | 0 | 0.49 | 0 | 0.46 | — | 0.36 | — | 0.38 | — |
| 3.6 ml Al Mag 1 | 0.59 | 0 | 0.73 | 0 | 1.2 | — | 1.3 | — | 1.3 | — |

The results show that the iron hydroxide treated particles improved in their performance on recycling. On the other hand, the performance of the particles coated with Al(OH)$_3$ fell off with each successive cycle, probably the result of dissolution of the gel coat at high pH, during regeneration.

The effectiveness of regeneration on the coated particles was demonstrated by reusing the material after one flocculation without treatment with alkali. In the following cycle, normal regeneration was used. The results obtained are shown in Table VIII (amount of alum used in flocculation was 5 mg/l).

TABLE VIII

| Cycle | 8 | | 9 | | 10 | |
|---|---|---|---|---|---|---|
| | T | C | T | C | T | C |
| FeMag 1 5 ml | 1.4 | 10 | 4.6 | 25 | 1.5 | 10 |

It can be seen that when the particles are not regenerated, the purification is poor, but regeneration before cycle 10 has restored the effectiveness.

EXAMPLE 10

This example shows the effect of increasing the amount of gel-coated particles, while keeping the amount of alum constant. Yarra River water was treated using a constant dose of 5 mg/l of alum, in conjunction with different quantities of coagulation aid (Fe Mag 4). The results are shown in Table IX.

TABLE IX

| | Amount of Coagulant Aid (ml/l) | Amount of Alum (mg/l) | Residual Turbidity (NTU) | Residual Colour (Pt—Co) |
|---|---|---|---|---|
| Fe Mag 4 | 5 | 5 | 6.6 | 45 |
| | 10 | 5 | 6.6 | 40 |
| | 15 | 5 | 2.9 | 5 |
| | 20 | 5 | 1.4 | 0 |
| Alum only | Nil | 5 | 13 | 60 |
| Alum only | Nil | 20 | 1.5 | 15 |

Yarra River water pH = 7.1
Turb = 14 NTU
Colour = 65 Pt—Co

The results show that the increase in Fe Mag 4 results in considerable improvement in the purity of the treated water. At four times the quantity, alum alone does not have as great an effect as can be achieved with Fe Mag 4/alum.

EXAMPLE 11

The physical stability of the coated particles is demonstrated in this example.

A sample of coated particles (Fe Mag 5) was prepared as in Example 7 using 0.25 g FeCl$_3$.6H$_2$O/g-.Fe$_3$O$_4$. Portion of this material was subjected to attrition by pumping it as an aqueous slurry (200 ml coated particles, settled volume in total volume of 250 ml) through a peristaltic pump at the rate of 100 ml/minute for 5 days. This material was then tested on Yarra River Water, pH 7.3, turbidity 13 and colour 65–70. A sample of the original coated particles was also tested for comparison. The tests were carried out using 20 ml/l of the coated particles and 5 mg/l of alum. The particulates were regenerated and recycled, and the results obtained on the third cycle are given in Table X.

TABLE X

| Flocculant | Turbidity | Colour |
|---|---|---|
| Fresh | 1 | <5 |
| After pumping 5 days | 0.5 | 0 |

It can be seen that the coated particles are stable to prolonged attrition.

EXAMPLE 12—Preparation of Gel Particles from Titanium Dioxide

Gel particles were prepared by slurrying titanium dioxide (RMS, 20 g, particle size 10–20 micron) in water (200 ml) and adding ferric chloride solution (60%, 5 ml) followed by sufficient dilute sodium hydroxide solution to bring the pH to 11.5. The mixture was boiled for 1 hour.

The particles were tested on the same water as in Example 11 using 5 ml/l of the material. The treated water had a turbidity of only 6.4 NTU and colour of <5 Pt/Co Units.

EXAMPLE 13—Separation of Chlorella Vulgaris

In this experiment, a sample of gel-coated magnetite (Fe Mag 5 from Example 11) was used in order to separate a suspension of Chlorella Vulgaris. This was achieved by contacting 50 ml of fresh Chlorella suspension (400 mg/l suspended solids) with 8 ml of settled Fe Mag 5 for 3 minutes, during which the flask was gently agitated. The suspension was allowed to settle and the supernatant was decanted and analysed for residual suspended solids. It was found that the residual suspended solid amounted to only 30 mg/l, indicating that 92.5% of the algae had been removed.

The adsorbed algae were recovered from the precipitated sludge by increasing the pH of the sludge to about 10.5 and agitating the mixture. On standing, the heavier gel-coated magnetite particles settled readily and the algae were removed as a suspension.

EXAMPLE 14—Use of a Polyelectrolyte

In this example, a sample of water from the Yarra River in Victoria was treated so as to compare the effectiveness of the polyelectrolytes plus magnetite activated according to Example 1 with alum plus the magnetite. The results are shown in Table XI.

TABLE XI

Raw Water ex Yarra River, Turbidy 33 NTU
Treatment carried out by Method 2B

| Coagulant | Quantity Coagulant p.p.m. | Final pH | Turbidity of Product Water (NTU) |
|---|---|---|---|
| 7-810[1] | 0.5 | 4 | 0.49 |
| 7-810 | 0.2 | 4 | 0.74 |
| C-573[2] | 0.5 | 4 | 0.84 |
| C-573 | 0.2 | 4 | 1.3 |
| Alum | 5 | 4 | 4.4 |
| Alum | 10 | 4 | 1.8 |
| Alum | 15 | 4 | 1.1 |
| Alum | 10 | 5 | 2.5 |
| Alum[3] | 30 | 5.5 | 1.5 |

Note [1]Flocculant supplied by applied chemicals Pty. Ltd., Australia; it is a liquid polyamine, strongly cationic, synthetic polyelectrolyte.
Note [2]Flocculant supplied by American Cyanamide Coy., USA; it is a liquid polyacrylamide, cationic, synthetic polyelectrolyte.
Note [3]No magnetite was used in this experiment.

EXAMPLE 15—Use of Polyelectrolyte

In this example, water from the Yan Yean Reservoir in Victoria was treated. The effectiveness of the combination of polyelectrolyte and magnetite activated according to Example 1 was compared with that of the magnetite alone and the alum alone. The results obtained are shown in Table XII.

TABLE XII

Raw Water from Yan Yean Reservoir, Turbidy 3.0 NTU

| Co-agulant | Quantity Magnetite | Quantity Coagulant | Treatment Method | Final pH | Turbidity of Product Water NTU |
|---|---|---|---|---|---|
| Alum | — | 10 mg/l | A | 5.5 | 3.0 |
| — | 10 ml/l | — | C | 4 | 0.82 |
| 7-810 | 10 ml/l | 0.2 mg/l | B | 4 | 0.22 |

TABLE XII-continued

Raw Water from Yan Yean Reservoir, Turbidy 3.0 NTU

| Co-agulant | Quantity Magnetite | Quantity Coagulant | Treatment Method | Final pH | Turbidity of Product Water NTU |
|---|---|---|---|---|---|
| C-573 | 10 ml/l | 0.2 mg/l | B | 4 | 0.32 |

It can be seen that the synthetic polyelectrolytes together with activated magnetite produced better quality water than alum alone or magnetite alone.

EXAMPLE 16—Effect of Particle Size

Using the method of Example 2B tests were carried out on water from the Yarra River (Melbourne, Australia) using three particles size fractions of the magnetite, 1–5μ, 6–15μ, 16–50μ. The water had an initial turbidity of 28 NTU, the pH was adjusted to 5 and 5 mg/l of alum was added. The results are set out in Table XIII.

TABLE XIII

| Particle size of Magnetite (μm) | Turbidity of Product Water (NTU) |
|---|---|
| 15–50 | 18 |
| 6–15 | 10 |
| 1–6 | 1.2 |

EXAMPLE 17—Effect of Particle Size

The importance of high surface area, i.e., small particle size, for the process was further demonstrated by comparing the performance of 1–5 μm magnetite with Bayer pigment grade magnetite, particle size 0.2 μm. (Product 318 M).

The water used was from the Mirabooka River, (Perth, Australia), with an initial turbidity of 8.8 and colour to 60 Pt-Co. pH was adjusted to 4 and an organic polyelectrolyte (Cyanamid C 573) was added at the rate of 0.5 mg/l, using the test of Example 2B. The results are set out in Table XIV.

TABLE XIV

| Particle Size of Magnetite (μm) | Product Water Turbid. (NTU) | Product Water Colour (Pt-Co) |
|---|---|---|
| 1–5 | 1.9 | 35 |
| 0.2 | 0.8 | 10 |

These results show clearly that magnetite particles used in carrying out the method described in the subject application should be as small as possible. The limitation is the difficulty in handling of particles <1 μm in size and thus particles in the range 1 to 5μ are to be preferred.

EXAMPLE 18—Use of Polyelectrolyte with Alum

Water from Mirrabooka in Western Australia was treated to compare the effect of using alum in conjunction with magnetite and polyelectrolyte. The results are shown in Table XV.

TABLE XV

Raw Water from Mirrabooka; uz,12/32 Turbidity 16 NTU, Colour 62[1]

| Quantity Magnetite | Quantity Alum | Coagulant | Final pH | Product Water Turbidity | Product Water Colour[1] |
|---|---|---|---|---|---|
| 10 ml/l | — | 8101[2], 2mg/l | 4 | 0.9 | 23 |
| 10 ml/l | 40 mg/l | — | 5 | 2.6 | 10 |

TABLE XV-continued

| Raw Water from Mirrabooka; uz,12/32 Turbidity 16 NTU, Colour 62[1] | | | | | |
|---|---|---|---|---|---|
| Quantity Magnetite | Quantity Alum | Coagulant | Final pH | Product Water Turbidity | Colour[1] |
| 10 ml/l | 40 mg/l | 8101[2],2mg/l | 5 | 0.9 | 9 |

[1]Measured spectrophotometrically at 400 nm after millipore filtration.
[2]Flocculant supplied by Catoleum Pty. Ltd.

Other polyelectrolytes which we have tested and found to work effectively are as follows:

| Name or Code No. | Manufacturer or Supplier | Type |
|---|---|---|
| Magnafloc LT22S | Allied Colloids | Cationic; polyacrylamides |
| Magnafloc 177 | Allied Colloids | Cationic; polyacrylamides |
| Superfloc C521 | Cyanamid | Cationic |
| Superfloc C573 | Cyanamid | Cationic; polyacrylamide |
| Superfloc C577 | Cyanamid | Cationic; polyacrylamide |
| Superfloc C581 | Cyanamid | Cationic; polyacrylamide |
| Superfloc N100S | Cyanamid | Anionic; polyacrylamide |
| Superfloc C460 | Cyanamid | Cationic |
| Alfloc 6361 | ICI Ltd. | Cationic |
| Alfloc 8101 | ICI Ltd. | Cationic |
| Wisprofloc P | Scholten's Chemische Fabrieken NV | Cationic; starch-based product |

We claim:

1. A process for the clarification of water which comprises the steps of:
   (a) contacting water at pH 3-5 with a coagulant/adsorbent consisting of a finely divided particulate mineral or clay material, the individual particles of which have a particle size of 10 microns or less and have a thin hydroxylated surface layer which has a positive zeta potential at the adsorption pH;
   (b) separating the water from the coagulant/adsorbent to obtain the clarified water;
   (c) treating a suspension of the spent coagulant/adsorbent to raise the pH to about 10.5;
   (d) separating the coagulant/adsorbent from the resulting effluent solution;
   (e) where necessary regenerating the coagulant/adsorbent by treatment with an alkaline solution;
   (f) separating the coagulant/adsorbent from the alkaline solution;
   (g) washing the regenerated coagulant/adsorbent with water;
   (h) separating the coagulant/adsorbent from the water; and
   (i) recycling the regenerated and washed coagulant/adsorbent to step (a).

2. A process as claimed in claim 1 wherein the individual particles have a particle size of 1 to 5 microns.

3. A process as claimed in claim 1, wherein the washing liquor separated from the coagulant/adsorbent in step (g) is used to raise the pH in step (c).

4. A process as claimed in claim 1, wherein the coagulant/adsorbent is a magnetic or magnetisable material and the separation steps (d), (f), and (h) are carried out magnetically.

5. Apparatus for carrying out the process of claim 4, comprising:
   (a) first mixing and contacting means for contacting water to be treated with the coagulant/adsorbent;
   (b) separating means for separating the treated water from the spent coagulant/adsorbent;
   (c) mixing and contacting means for contacting the spent coagulant/adsorbent with dilute alkali for pH adjustment;
   (d) magnetic separation means for separating the coagulant/adsorbent from the resulting effluent;
   (e) optionally mixing and contacting means for contacting the coagulant/adsorbent with alkali for regeneration of the coagulant/adsorbent where necessary;
   (f) magnetic separation means for separating the coagulant/adsorbent from the alkali and recycling the latter to means (e);
   (g) mixing and contacting means for contacting the coagulant/adsorbent with water for washing; and
   (h) magnetic separation means for separating the coagulant/adsorbent from the water, recycling the water to means (c) and the coagulant/adsorbent to means (a).

6. Apparatus as claimed in claim 5, wherein at least one of the mixing and contacting means (a), (c), (e) and (g) comprises a long pipe with turbulent flow conditions therein when in use.

7. Apparatus as claimed in claim 6, wherein the separating means (b) comprises a solids recirculation clarifier.

8. A process as claimed in claim 1, wherein alum is added to the water between steps (a) and (b).

9. A process as claimed in claim 8, wherein alum is recovered from the effluent from step (d).

10. A method for removing suspended impurities and colored substances from water by coagulation which comprises contacting the water at pH 3-5 with a coagulant/adsorbent consisting of a finely divided particulate mineral or clay material, the individual particles of which have a particle size of 10 microns or less and have been treated to produce a thin hydroxylated surface layer having a positive zeta potential at the adsorption pH and then separating the thus treated water from the coagulant/adsorbent.

11. A method as claimed in claim 10 wherein the individual particles have a particle size of 1 to 5 microns.

12. A method as claimed in claim 10, wherein the hydroxylated layer is derived from the substance of the particulate material.

13. A method as claimed in claim 12, wherein the particulate material is an oxide or silicate.

14. A method as claimed in claim 12, wherein the particulate material is a magnetic or magnetisable material.

15. A method as claimed in claim 12, wherein the particulate material is selected from the group consisting of gamma iron oxide, magnetite and ferrites.

16. A method as claimed in claim 10, wherein the hydroxylated layer is derived from another substance.

17. A method as claimed in claim 16, wherein the particulate material is selected from the group consisting of oxides, sulphates, silicates, carbonate minerals and clays.

18. A method as claimed in claim 16, wherein the particulate material is selected from the group consisting of calcium sulphate, calcium carbonate, zinc oxide, barium sulphate, silica, sand, glass, mica, china clay, pyrophillite, gamma iron oxide, magnetite and ferrites.

19. A method as claimed in claim 16, wherein the hydroxylated layer is a metal hydroxide gel which is substantially insoluble in water.

20. A method as claimed in claim 16, wherein the hydroxylated layer is ferric, aluminium, zicronium or thorium hydroxide.

21. A method as claimed in claim 10, wherein a substance containing a multi valent cation is added to the water after the coagulant/adsorbent and before separation.

22. A method according to claim 21 wherein the amount of multivalent cation compound is 5 to 40 mg/l of water.

23. A method according to claim 22 wherein the multi-valent cation is ferric or aluminum.

24. A method as claimed in claim 21, wherein the multivalent cation is ferric or aluminium.

25. A method as claimed in claim 10 wherein a polyelectrolyte is added to the water after the coagulant/adsorbent and before separation.

26. A method as claimed in claim 25, wherein the polyelectrolyte is a cationic polyelectrolyte.

27. A method as claimed in claim 10, wherein after separation from the water, the spent coagulant/adsorbent is freed from adsorbent impurities by raising the pH of a suspension of the spent material and separating the coagulant/adsorbent from the resulting solution.

28. A method as claimed in claim 10, wherein the coagulant adsorbent is regenerated subsequent to or simultaneously with the step of claim 27 by treatment with an alkaline solution.

29. A method as claimed in claim 10, wherein the coagulant/adsorbent is magnetic or magnestisable.

* * * * *